(12) United States Patent
Archambault et al.

(10) Patent No.: US 9,693,633 B2
(45) Date of Patent: Jul. 4, 2017

(54) SEAT ADJUSTMENT SYSTEM

(71) Applicant: BAULTAR I.D. INC., Val Joli Quebec (CA)

(72) Inventors: Etienne Archambault, Sherbrooke (CA); Andre Albert, Sherbrooke (CA); Etienne L'Huillier, Sherbrooke (CA); Maxime Laplante, Sherbrooke (CA); Mathieu Rocheleau, Sherbrooke (CA); Jimmy Rondeau, Sherbrooke (CA)

(73) Assignee: CREATIONS I.D. B05 INC., Windsor (Quebec) (CA)

( * ) Notice: Subject to any disclaimer, the term of this patent is extended or adjusted under 35 U.S.C. 154(b) by 154 days.

(21) Appl. No.: 14/809,782

(22) Filed: Jul. 27, 2015

(65) Prior Publication Data

US 2015/0329013 A1 Nov. 19, 2015

Related U.S. Application Data

(62) Division of application No. 13/624,419, filed on Sep. 21, 2012, now Pat. No. 9,089,217.

(51) Int. Cl.
| | |
|---|---|
| *A47C 7/00* | (2006.01) |
| *A47C 3/20* | (2006.01) |
| *A47C 3/18* | (2006.01) |
| *A47C 3/40* | (2006.01) |
| *B60N 2/14* | (2006.01) |
| *B60N 2/16* | (2006.01) |

(52) U.S. Cl.
CPC ............... *A47C 7/00* (2013.01); *A47C 3/18* (2013.01); *A47C 3/20* (2013.01); *A47C 3/40* (2013.01); *B60N 2/146* (2013.01); *B60N 2/163* (2013.01); *B60N 2/1685* (2013.01)

(58) Field of Classification Search
CPC .... A47C 3/30; A47C 3/34; A47C 3/40; A47C 7/004; A47C 3/28; A47B 9/20; A47B 2220/0025
USPC ............... 297/344.12, 344.18, 344.19, 344.2
See application file for complete search history.

(56) References Cited

U.S. PATENT DOCUMENTS

| | | | |
|---|---|---|---|
| 4,061,304 A | 12/1977 | Schattmaier | |
| 4,705,256 A | 11/1987 | Hofrichter | |
| 4,757,968 A | 7/1988 | Kinanen et al. | |
| 4,948,086 A | 8/1990 | Buol et al. | |
| 5,149,035 A | 9/1992 | Bonnema et al. | |
| 5,374,102 A | 12/1994 | Archambault et al. | |
| 5,385,323 A | 1/1995 | Garelick | |

(Continued)

*Primary Examiner* — Sarah McPartlin
(74) *Attorney, Agent, or Firm* — Nath, Goldberg & Meyer; Jerald L. Meyer

(57) ABSTRACT

A seat support with adjustment systems allowing a height and swivel adjustment functionality of the seat in a manner free of any wobble and shaking motion. The seat mechanism for height and swivel adjustments have screw adjustment applying a pre-load on a resilient component which gives a resilient force on a load bearing surface. The load bearing surface guides the seat part in motion during seat adjustment in a way to reduce friction and wear with use in time. The screw adjustment and the resilient component are configured such that play in guiding of the seat part in motion during seat adjustment is eliminated regardless of fabrication and component variations, and wear, with use in time. A screw adjustment locking device is configured to assure a stable adjustment with use in time.

15 Claims, 6 Drawing Sheets

(56) References Cited

U.S. PATENT DOCUMENTS

| | | |
|---|---|---|
| 5,921,628 A | 7/1999 | Glockl |
| 5,992,815 A | 11/1999 | Metzdorf et al. |
| 6,012,775 A * | 1/2000 | Czarnecki ................ A47C 3/30 297/344.13 |
| 6,131,997 A | 10/2000 | Cao |
| 6,378,816 B1 | 4/2002 | Pfister |
| 6,447,065 B1 | 9/2002 | Ropp |
| 8,011,308 B2 | 9/2011 | Picchio |
| 8,641,144 B2 * | 2/2014 | Davis, Jr. ................ A47C 3/18 248/415 |

* cited by examiner

SEAT ADJUSTMENT SYSTEM

CROSS-REFERENCE TO RELATED APPLICATIONS

This is a Divisional application of U.S. patent application Ser. No. 13/624,419, filed Sep. 21, 2012, the content of which is hereby incorporated by reference in its entirety.

FIELD OF THE INVENTION

The present invention relates to vehicle seat systems. More particularly, the present invention relates to a seat adjustment system.

BACKGROUND OF THE INVENTION

Vehicle seat systems include various functional mechanisms. In seat design, there is a need for an improved seat height adjustment guiding mechanism and to a seat rotation adjustment guiding mechanism that prevent any wobble and shaking motion during operational use.

U.S. Pat. No. 5,374,102 describes a seat height adjustment guiding mechanism including three screw adjustment mechanisms with Belleville washers that are configured to tighten in close contact one sliding cylindrical part with a second stationary cylindrical part while restricting rotation motion. The document does not appear to clearly explain which component of the mechanism is configured to absorb any mechanism part dimensional variation in order to be able to provide free space when a maintenance person will tighten screws more to keep a good contact with the sliding cylindrical part.

More precisely, U.S. Pat. No. 5,374,102 describes three identical vertically oriented bars which keep roller bearings in position. Typically during the assembly of the mechanism, the two first vertically oriented bar being screwed would inherently be screwed until contact is made between the vertically oriented bar and the stationary cylindrical part in which the roller bearings are contained or between the two cylindrical parts in opposite location with respect to the location where the roller bearing is applying load between the two cylindrical parts. This last solution results in too much friction to enable smooth linear motion guiding and requires re-adjustment between the three vertically oriented bars. In the first solution, which is certainly the best, the role of each of the three vertically oriented bars is not identical and therefore it is not obvious for a maintenance person to determine which bolt should be tightened more.

Assembly of the above mechanism has to include an iterative tightening of the six screws slightly one after the other until the proper compression is achieved. However, it would be desirable if this solution could be avoided.

One important function of such a guiding mechanism is to restrict rotation between the two cylindrical parts. The document does not appear to clearly explain which component of the mechanism is configured to absorb the rotation load applied on the sliding cylindrical part which is transmitted on the roller bearings. This rotation load between the two cylindrical parts is transformed in two force components on each roller bearing. The first component is a friction force parallel to the rolling surface of the bearing and the other one is perpendicular to the rolling surface of the bearing. This last perpendicular force is not centered on the roller bearing thickness depending on which direction the rotation load and therefore the screws of the floating vertically oriented bar will experience flexion forces.

Moreover, the screws of the floating vertically oriented bar are softly pre-loaded in order to allow roller bearings to still roll. These conditions give screws that are not pre-loaded enough to ensure a good fatigue resistance in particular to flexion forces. In the presence of dynamic and cycling stresses, the screws are at risk of sudden failure.

Finally, U.S. Pat. No. 5,374,102 does not provide a means to ensure that adjustment will not change over time with vibration and stresses, especially on the screws of the floating vertically oriented bar which are not fully pre-loaded.

U.S. Pat. No. 4,705,256 describes a seat swivel adjustment guiding mechanism which uses a well-known central bolt pivot with an addition of at least one bearing clamp in order to secure the mechanism and to transfer a portion of the off centered loads of the swivel plate directly to the stationary frame under. Typically the central bolt pivot is welded in position to reduce the risk of loosening. This system must occupy the central area of the seat mechanism where the pivot bolt is located. In the same manner, U.S. Pat. No. 4,948,086A describes a rotating guide with bearing acetal plate and coil spring to exert compressive force on the sliding assembly. This device has a screw system also occupying the central area of the seat.

U.S. Pat. No. 6,447,065B1 describes a load clamping mechanism, which clears the central area of the device, and is configured to adjust the pressure exerted on bearings to vary the rotating force needed for rotation of the swivel system.

U.S. Pat. No. 5,374,102 also describes a seat swivel adjustment guiding mechanism with a free central portion which is occupied with a cylinder with its handle for powering and activating the height adjustment. The guiding is done with interaction of two concentrically cylindrical tubes. In this condition however, it is difficult to control in an adjustable way the mechanical free play to prevent wobbling and shaking motion.

There is thus a need for a seat adjustment system, which by virtue of its design and components would be able to overcome or at least minimize at least one of the above-mentioned drawbacks.

SUMMARY OF THE INVENTION

The object of the present invention is to provide an adjustment system that addresses at least one of the above-mentioned needs.

According to the present invention, there is provided an adjustment system for adjusting a position of a first component of a seat with respect to a second component of the seat, comprising:
- a set of bearing elements providing reduced frictional contact between the first and second components, being arranged on boundaries between the first and second components;
- an adjustment mechanism configured such that the set of bearing elements applies a substantially evenly distributed frictional contact between the first and second components, the adjustment mechanism comprising:
  - a set of at least one guiding surface combined with a set of at least one threaded element positioned on the second component;
  - a threaded fastener mounted on the at least one threaded element for adjustably pushing the set of bearing elements into contact with the first component;

a resilient washer element positioned between the threaded fastener and one bearing element of the set of bearing elements for applying a resilient pre-load therebetween; and an adjustment locking element for locking a selected adjustment configuration of the threaded fastener; and a locking assembly for locking the position of the first component with respect to the second component.

BRIEF DESCRIPTION OF THE DRAWINGS

These and other objects and advantages of the invention will become apparent upon reading the detailed description and upon referring to the drawings in which.

DETAILED DESCRIPTION OF THE INVENTION

In the following description, the same numerical references refer to similar elements. Furthermore, for the sake of simplicity and clarity, namely so as not to unduly burden the figures with several reference numbers, only certain figures have been provided with reference numbers, and components and features of the present invention illustrated in other figures can be easily inferred therefrom. The embodiments, geometrical configurations, and/or dimensions shown in the figures are preferred for exemplification purposes only.

Moreover, although the present invention was primarily designed for a seat mountable in a vehicle, for example, it may also be mountable to other devices or in other fields, as apparent to a person skilled in the art. For this reason, expressions such as "vehicle", "seat", etc., as used herein should not be taken as to limit the scope of the present invention and includes all other kinds of materials, objects and/or purposes with which the present invention could be used and may be useful.

In addition, although the preferred embodiment of the present invention as illustrated in the accompanying drawings comprises various components and although the preferred embodiment of the adjustment system as shown consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable geometrical configurations may be used for the adjustment systems, and corresponding parts, according to the present invention, as briefly explained and as can easily be inferred herefrom by a person skilled in the art, without departing from the scope of the invention.

An object of the invention is to provide a seat support including adjustment systems allowing height and swivel adjustment functionality of the seat in a manner free of any wobble and shaking motion. The adjustment systems for height and swivel adjustments have a screw adjustment applying a pre-load on a resilient component which gives a resilient force on a load bearing surface. The load bearing surface guides the seat element in motion during seat adjustment in a way to reduce friction and wear in use with time. The screw adjustment and the resilient component are configured such that play in guiding of the seat part in motion during seat adjustment is eliminated regardless of fabrication and component variations, and wear in use with time. A screw adjustment locking device is configured to assure a stable adjustment in use with time.

Figure 1:
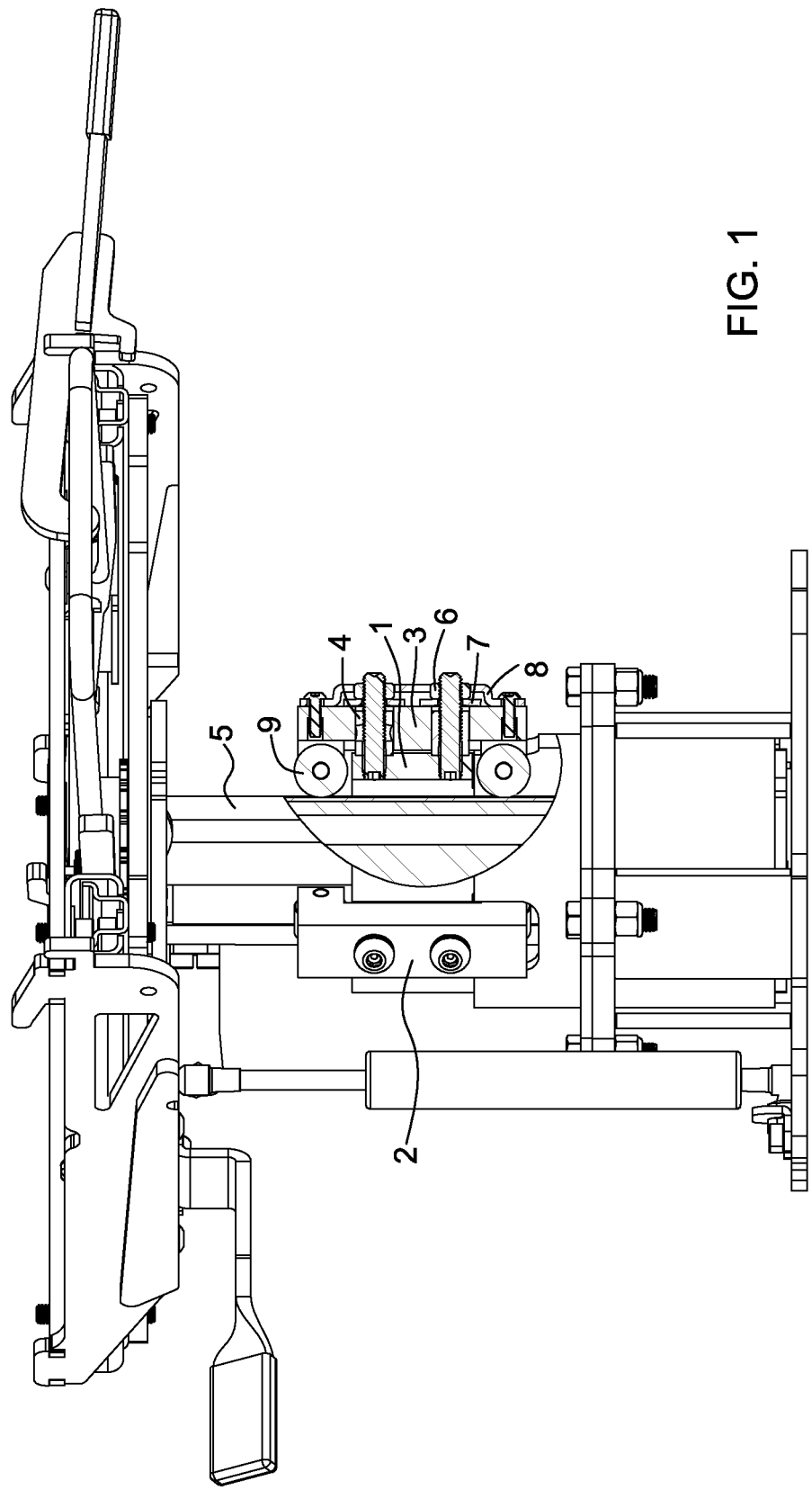
FIG. 1 is a perspective, partially cut view of two adjustment systems, according to preferred embodiments of the present invention.
Figure 2:
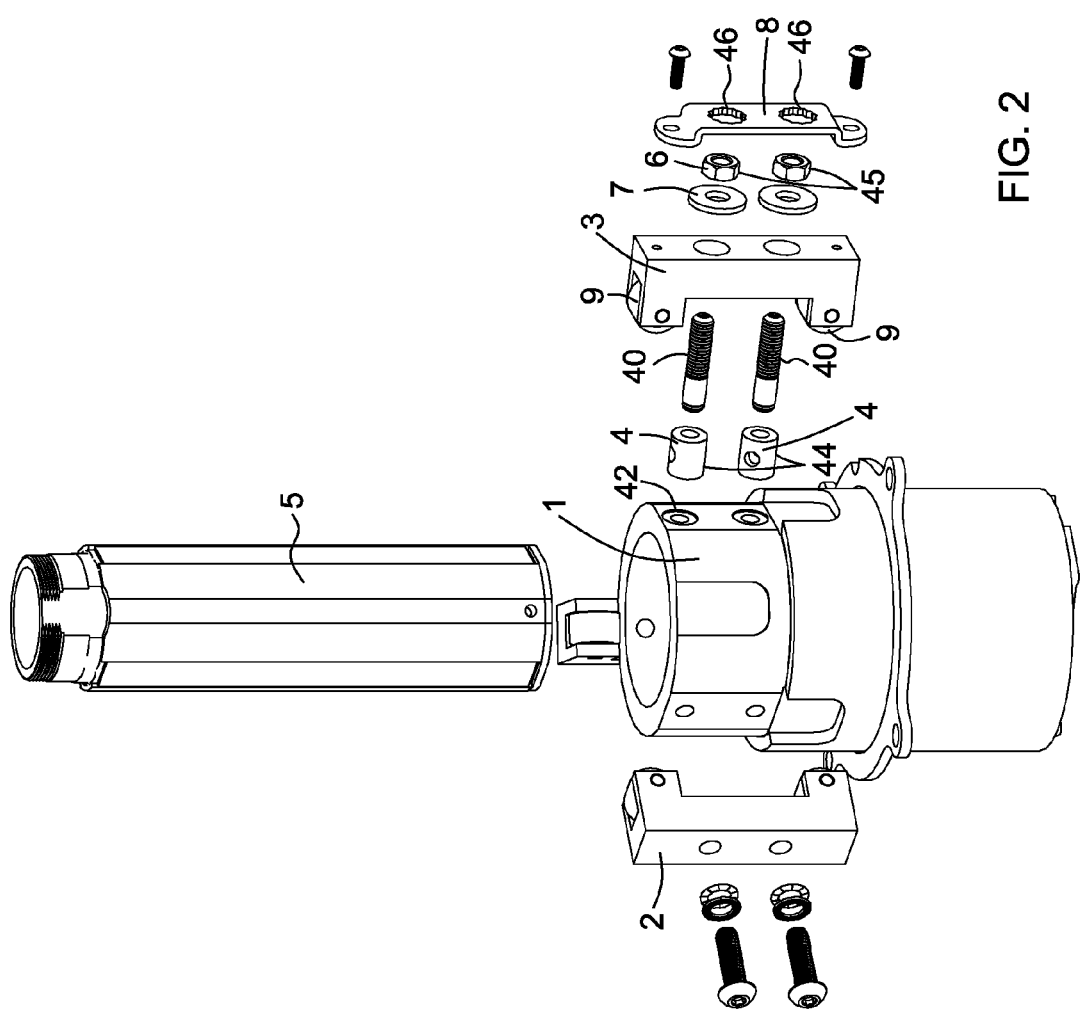
FIG. 2 is an exploded view of one of the adjustment systems shown in FIG. 1.
Figure 3:
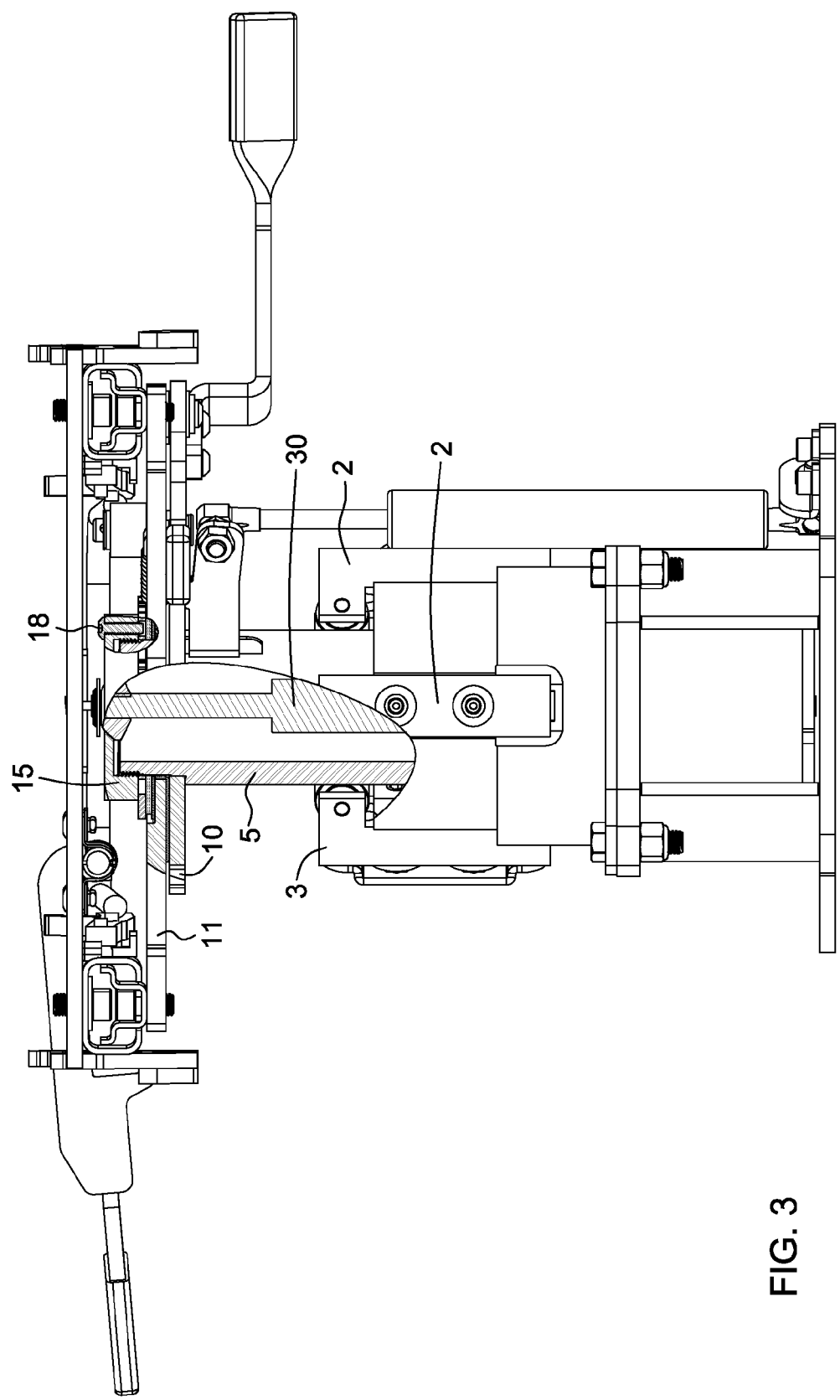
FIG. 3 is a side, partially cut view of the two adjustment systems shown in FIG. 1.

More particularly, and in accordance with the present invention, the above object is achieved, as shown for example in FIGS. 1 and 2, with an adjustment system for adjusting a position of a first component 5 of a seat with respect to a second component 1 of the seat. The adjustment system includes a set of bearing elements 9 providing reduced frictional contact between the first and second components. The bearing elements 9 are arranged on boundaries between the first and second components. The system also includes an adjustment mechanism configured such that the set of bearing elements 9 applies a substantially evenly distributed frictional contact between the first and second components. The adjustment mechanism includes a set of at least one guiding surface 4 combined with a set of at least one threaded element 40 positioned on the second component 1. The adjustment mechanism includes a threaded fastener 6 mounted on the at least one threaded element 40 for adjustably pushing the set of bearing elements 9 into contact with the first component 5. A resilient washer element 7 is positioned between the threaded fastener 6 and one bearing element of the set of bearing elements 9 for applying a resilient pre-load therebetween. The adjustment mechanism also includes an adjustment locking element 8 for locking a selected adjustment configuration of the threaded fastener 6. As shown in FIG. 3, a locking assembly 30 can lock the position of the first component 5 with respect to the second component 1.

Preferably, in an embodiment related to height adjustment of the seat shown in FIGS. 1 to 3, the first component 5 is a sliding cylindrical member 5 having three equally circumferentially spaced flattened portions formed in a part thereof for guiding the sliding movement and preventing rotational movement. The second component 1 is a stationary cylindrical structure 1 into which the sliding cylindrical member 5 fits in an axially displaceable manner. The stationary cylindrical structure 1 has three equally circumferentially spaced flattened portions with fastening means 42.

Preferably, the set of bearing elements 9 comprises a pair of fixed roller bearing callipers 2 and one adjustably mounted roller bearing calliper 3 contacting the flattened portions of the sliding cylindrical member 5. The callipers 2,3 are mounted on the three equally circumferentially spaced flattened portions of the second component 1 The set of at least one guiding surface 4 includes two cylindrical translation guides 44 for receiving the adjustably mounted roller bearing calliper 3 on the stationary cylindrical structure 1.

Preferably, the set of at least one threaded element 40 in combination with the cylindrical translation guides 44 form threaded studs.

Preferably, the threaded fastener 6 comprises a pair of adjustment nuts 45 fastening to the adjustably mounted roller bearing calliper 3.

Figure 7:
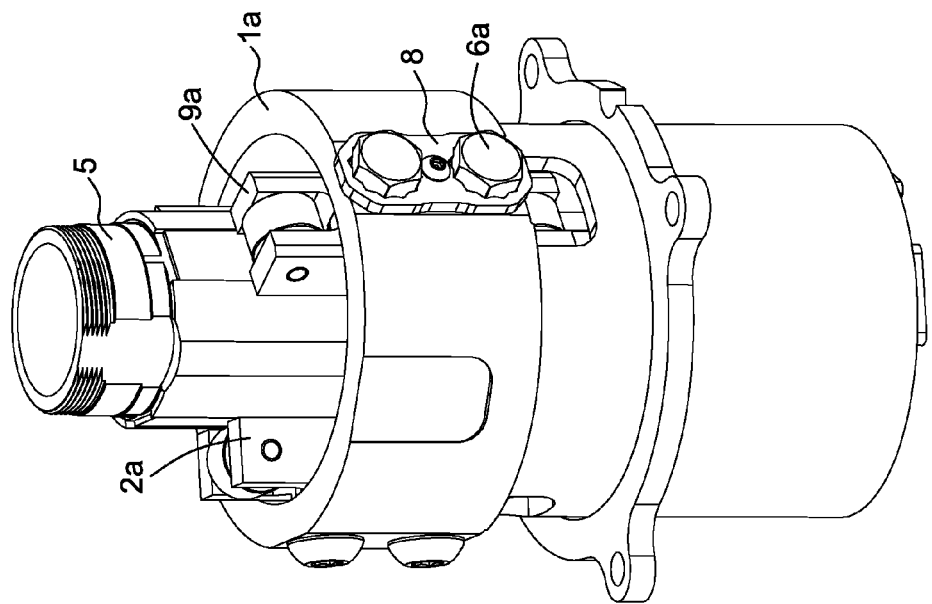
FIG. 7 is a perspective view of the adjustment system shown in FIG. 6.
Figure 6:
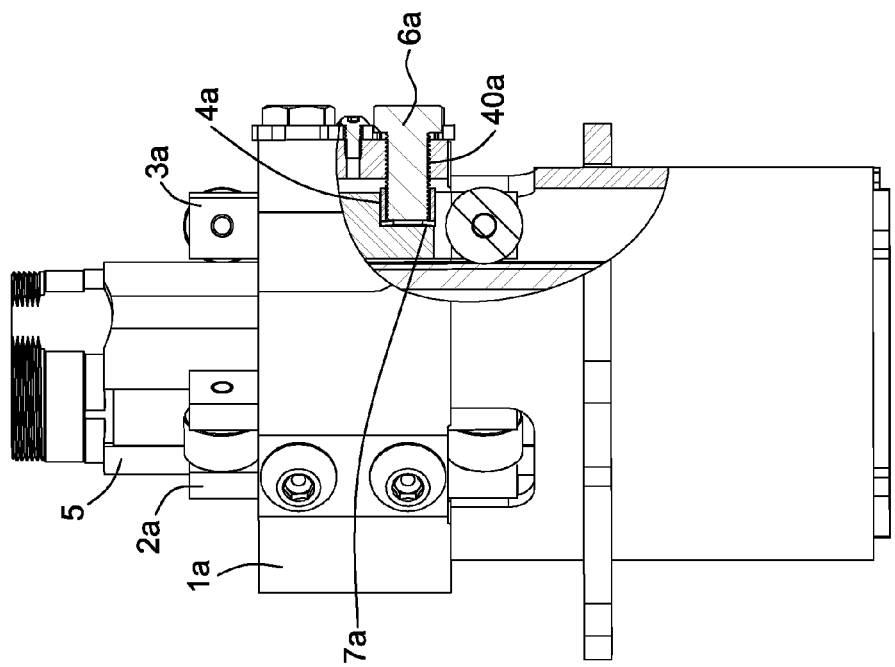
FIG. 6 is a side, partially cut view of an adjustment system, according to another preferred embodiment of the present invention.

Preferably, in another embodiment related to the adjustment mechanism, as shown in FIGS. 6 and 7, the set of guiding surfaces 4*a* and the set of resilient washer elements 7*a* are positioned internally within the adjustably mounted roller bearing calliper 3*a* for applying a resilient pre-load, when constrained by a threaded fastener 6*a* screwed in the threaded element 40*a* of the second component 1*a*. In this embodiment, the callipers 2*a* and 3*a* are all included between the sliding cylindrical member 5 and the stationary cylindrical structure 1*a* such that threaded fasteners are not constrained in tension. Preferably the threaded fastener 6*a* comprises a pair of adjustment screws positioning the adjustably mounted roller bearing calliper 3*a* and screwed to the second component 1*a*.

Preferably, the resilient washer element 7 comprises a pair of Belleville washers positioned between the adjustment nuts 45 or the adjustment screws 6*a* and the adjustably mounted roller bearing calliper 3.

Preferably, as better shown in FIGS. 2 and 7, the adjustment locking element 8 includes a pair of apertures 46 shaped to engage the pair of adjustment nuts 45 or adjustment screws 6*a* such that the locking element 8 locks a rotational position of the adjustment nuts 45 or adjustment screws 6*a* within a closest rotating angle that ensures engagement with the pair of apertures 46.

Preferably, as better shown in FIG. 3, the locking assembly 30 includes a height power and locking system positioned within the sliding cylindrical member 1. The height power and locking system has an activation rod positioned in a rotational center of the seat.

Figure 4:
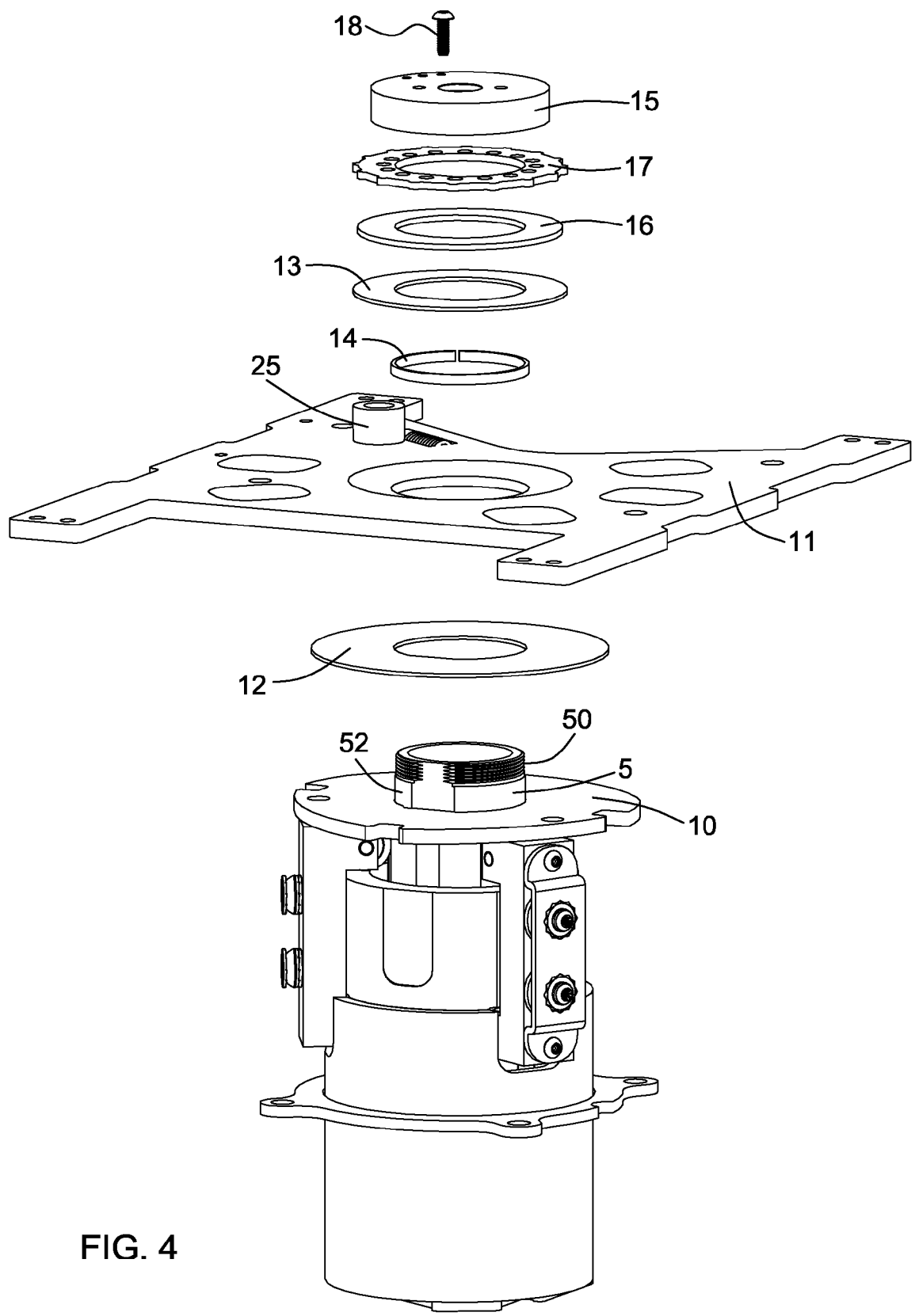
FIG. 4 is an exploded view of another one of the adjustment systems shown in FIG. 1.
Figure 5:
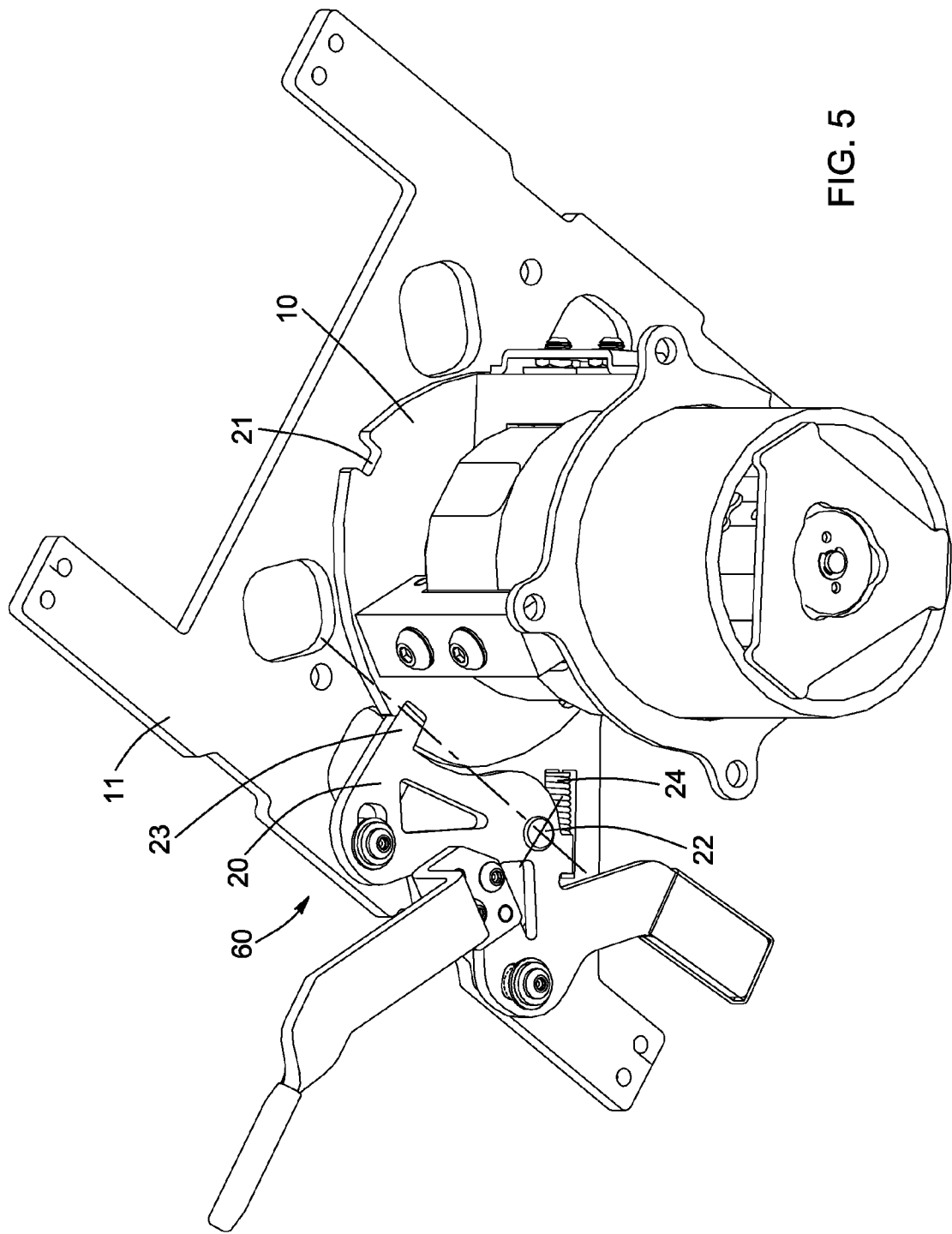
FIG. 5 is a bottom perspective view of the two adjustment systems shown in FIG. 1.

Preferably, in another embodiment related to swivel adjustment of the seat shown in FIGS. 3 to 5, the first component is a rotating plate 11 for receiving the seat. The rotating plate 11 has a central hole for guiding rotation of the rotating plate and preventing transversal movement. The second component is a base rotation plate 10 configured for receiving the rotating plate 11.

Preferably, in this other embodiment, the set of bearing elements comprises a set of low friction annular surface elements 12,13,14 concentrically positioned on either side of the rotating plate (for elements 12,13) and in the central hole of the rotating plate (for element 14). The set of at least one guiding surface is composed of one cylindrical rotational guide 5.

Preferably, as better shown in FIG. 4, the threaded element 50 in combination with the cylindrical rotational guide 52 form a threaded portion of an integral cylindrical part.

Preferably, the threaded fastener comprises a clamping disc 15 having a threaded interface for adjustably applying pressure to the low friction annular surface elements 12,13,14 and rotating plate 11 against the base rotation plate 10.

Preferably, the resilient washer element is an annular surface element 16 made of a flexible and resilient material concentrically positioned between the clamping disc 15 and one of the low friction annular surface elements 12,13,14.

Preferably, the adjustment locking element is a locking screw 18 traversing the clamping disc 15 and interfacing with a locking ring 17 on an opposite side of the clamping disc 15. The clamping disc 15 has preferably three threaded apertures. The locking ring 17 has preferably a plurality of holes evenly positioned around a circumference thereof at regular angular separation distances that are smaller than the angular separation distances between the threaded apertures on the clamping disc. The holes on the locking ring can be positioned to be in register with the apertures on the clamping disc. Upon installation, once pressure is applied against the low friction annular surface elements, one of the three apertures on the clamping disc can be aligned with one of the holes on the locking ring. A screw can then be inserted in the threaded aperture to fix the relative angular position between the clamping disc and the locking ring. Having three apertures on the locking ring and the plurality of holes on the locking ring helps provide more increments between adjustment positions than having a single aperture on the clamping disc and a smaller number of holes on the locking ring. Each of the three apertures can be aligned with one of the holes on the locking ring.

Preferably, as better shown in FIG. 5, the locking assembly comprises a locking latch assembly 60 for locking the rotating plate 11 with respect to the base rotation plate 10.

Preferably, the locking latch assembly includes a plurality of notches 21 positioned on an external diameter of the base rotation plate 10 and a latch element 20 pivotably mounted on the rotating plate 11. The latch element 20 has a latch tooth 23 shaped to engage each of the plurality of notches 21.

Preferably, the latch element 20 is pivotable about a pivot 22 positioned perpendicularly with respect to the engagement direction at an engagement point between the latch tooth 23 and one of the notches 21.

Preferably, the pivot 22 has a low friction bearing surface.

Preferably, a spring 24 is provided for urging engagement and interlocking between the latch tooth and one of the notches at the engagement point, and thus maintain a swivel locking position.

Of course, the scope of the invention should not be limited by the preferred embodiments set forth in the examples, but should be given the broadest interpretation consistent with the description as a whole. Numerous modifications could be made to the above-described embodiments without departing from the scope of the invention, as apparent to a person skilled in the art.

The invention claimed is:

1. An adjustment system for adjusting a position of a first component of a seat with respect to a second component of the seat, comprising:
    a set of bearing elements providing reduced frictional contact between the first and second components, being arranged on boundaries between the first and second components;
    an adjustment mechanism configured such that the set of bearing elements applies a substantially evenly distributed frictional contact between the first and second components, the adjustment mechanism comprising:
        a set of at least one guiding surface combined with a set of at least one threaded element;
        a threaded fastener mounted on the at least one threaded element for adjustably pushing the set of bearing elements into contact with the first component;
        a resilient washer element positioned between the threaded fastener and one bearing element of the set of bearing elements for applying a resilient pre-load therebetween; and
        an adjustment locking element for locking a selected adjustment configuration of the threaded fastener; and a locking assembly for locking the position of the first component with respect to the second component, wherein:

the first component is a rotating plate for receiving the seat, the rotating plate comprising a central hole for guiding rotation of the rotating plate and preventing transversal movement; and the second component is a base rotation plate configured for receiving the rotating plate.

2. The adjustment system according to claim 1, wherein the set of at least one guiding surface comprises one cylindrical rotational guide.

3. The adjustment system according to claim 1, wherein:
the set of bearing elements comprises a set of low friction annular surface elements concentrically positioned on either side of the rotating plate and in the central hole of the rotating plate.

4. The adjustment system according to claim 2, wherein the set of at least one threaded element in combination with the cylindrical rotational guide form a threaded portion of an integral cylindrical part.

5. The adjustment system according to claim 4, wherein the threaded fastener comprises a clamping disc comprising a threaded interface for adjustably applying pressure to the low friction annular surface elements and rotating plate against the base rotation plate.

6. The adjustment system according to claim 5, wherein the resilient washer element comprises an annular surface element made of a flexible and resilient material concentrically positioned between the clamping disc and one of the low friction annular surface elements.

7. The adjustment system according to claim 5, wherein the adjustment locking element comprises a locking screw traversing the clamping disc.

8. The adjustment system according to claim 7, wherein the locking screw interfaces with a locking ring on an opposite side of the clamping disc.

9. The adjustment system according to claim 1, wherein the locking assembly comprises a locking latch assembly for locking the rotating plate with respect to the base rotation plate.

10. The adjustment system according to claim 9, wherein the locking latch assembly comprises a plurality of notches positioned on an external diameter of the base rotation plate and a latch element pivotably mounted on the rotating plate and comprising a latch tooth shaped to engage each of the plurality of notches.

11. The adjustment system of claim 10, wherein the latch element is pivotable about a pivot positioned perpendicularly with respect to an engagement direction at an engagement point between the latch tooth and one of the plurality of notches.

12. The adjustment system of claim 11, wherein the pivot comprises a low friction bearing surface.

13. The adjustment system of claim 11, further comprising a spring for urging engagement and interlocking between the latch tooth and said one of the plurality of notches at the engagement point.

14. The adjustment system of claim 5, wherein the clamping disc comprises a central aperture.

15. The adjustment system according to claim 14, wherein the central aperture is sized to receive a height power and locking system positioned in a rotational center of the seat.

* * * * *